US009060469B2

(12) United States Patent
Kamon, II (10) Patent No.: US 9,060,469 B2
(45) Date of Patent: Jun. 23, 2015

(54) MOBILE ASSEMBLY WITH SCREEN FOR PLANT TRAINING

(76) Inventor: David Kamon, II, Fraser, MI (US)

( * ) Notice: Subject to any disclaimer, the term of this patent is extended or adjusted under 35 U.S.C. 154(b) by 0 days.

(21) Appl. No.: 13/607,995

(22) Filed: Sep. 10, 2012

(65) Prior Publication Data

US 2013/0062478 A1 Mar. 14, 2013

Related U.S. Application Data

(60) Provisional application No. 61/532,312, filed on Sep. 8, 2011.

(51) Int. Cl.
*A47K 1/04* (2006.01)
*A01G 17/04* (2006.01)
*A01G 9/12* (2006.01)

(52) U.S. Cl.
CPC ............... *A01G 17/04* (2013.01); *A01G 9/124* (2013.01)

(58) Field of Classification Search
USPC ......... 248/129, 126, 127, 128, 132, 138, 121, 248/125.3, 125.8, 345, 346.1, 694, 907, 248/688, 95, 98, 150, 151, 152, 528, 165, 248/168; 220/628
See application file for complete search history.

(56) References Cited

U.S. PATENT DOCUMENTS

| 396,459 | A | * | 1/1889 | Bertrand | 47/66.1 |
|---|---|---|---|---|---|
| 846,451 | A | * | 3/1907 | Burry | 248/129 |
| 931,849 | A | * | 8/1909 | Dickenson | 248/129 |
| 1,371,796 | A | * | 3/1921 | Loudon | 248/185.1 |
| 2,048,608 | A | * | 7/1936 | Holland | 248/150 |
| 2,136,279 | A | * | 11/1938 | DeVilbiss | 248/153 |
| 2,171,982 | A | * | 9/1939 | Holbrook | 210/316 |
| 2,505,305 | A | * | 4/1950 | Schaefer | 4/289 |
| 2,588,830 | A | * | 3/1952 | Haanstad | 84/421 |
| 2,715,005 | A | * | 8/1955 | Hildebrand | 248/154 |
| 2,861,764 | A | * | 11/1958 | Fisher | 248/146 |
| 3,284,039 | A | * | 11/1966 | Brunner | 248/153 |
| 3,554,573 | A | * | 1/1971 | Miller | 280/79.2 |
| 3,605,336 | A | * | 9/1971 | Meisler | 47/45 |
| 3,756,548 | A | * | 9/1973 | Santarelli et al. | 248/98 |
| 3,870,367 | A | * | 3/1975 | O'Brien | 298/1 B |
| 3,888,442 | A | * | 6/1975 | Comeaux | 248/98 |
| 3,893,699 | A | * | 7/1975 | Morris | 280/659 |
| 4,032,097 | A | | 6/1977 | Dwyer | |
| 4,138,139 | A | * | 2/1979 | Alfonso | 280/652 |
| 4,280,344 | A | * | 7/1981 | O'Connor | 68/213 |
| D281,364 | S | * | 11/1985 | DiFede | D34/23 |
| 4,593,873 | A | * | 6/1986 | Nelson | 248/98 |
| 4,614,350 | A | * | 9/1986 | Bunch | 280/47.24 |
| 4,948,077 | A | * | 8/1990 | Gonzalez | 248/129 |
| 5,040,762 | A | * | 8/1991 | Potter | 248/460 |
| 5,048,712 | A | * | 9/1991 | Wolters | 220/262 |
| 5,193,770 | A | * | 3/1993 | Kildare | 248/97 |
| 5,316,248 | A | * | 5/1994 | Allen | 248/129 |
| 5,472,220 | A | * | 12/1995 | Stephan | 280/79.5 |
| 5,678,842 | A | * | 10/1997 | Hook et al. | 280/646 |

(Continued)

FOREIGN PATENT DOCUMENTS

GB 2307428 A * 5/1997

*Primary Examiner* — Monica Millner
(74) *Attorney, Agent, or Firm* — Mitchell Law PLLC; Matthew W. Mitchell (57) ABSTRACT

A mobile plant training apparatus is disclosed. The mobile plant training apparatus includes a screen frame, a screen coupled to the screen frame, and a mobile assembly configured to removeably secure a container and secure the screen frame above the container.

15 Claims, 7 Drawing Sheets

(56) References Cited

U.S. PATENT DOCUMENTS

| | | | |
|---|---|---|---|
| D410,123 S * | 5/1999 | Matarazzo et al. | D32/54 |
| 6,119,393 A * | 9/2000 | Wourms et al. | 47/39 |
| 6,234,432 B1 * | 5/2001 | Piller et al. | 248/129 |
| 6,398,040 B1 * | 6/2002 | Gregory | 211/14 |
| 6,419,246 B1 * | 7/2002 | Neal | 280/79.5 |
| 6,666,465 B2 * | 12/2003 | Chan | 280/47.26 |
| 6,725,970 B2 * | 4/2004 | Garofalo | 182/115 |
| 6,761,271 B1 * | 7/2004 | Cresswell | 210/456 |
| 6,776,379 B2 | 8/2004 | Sherer | |
| 6,851,686 B2 * | 2/2005 | Figueroa | 280/79.5 |
| 7,111,811 B2 * | 9/2006 | Weldy | 248/150 |
| 7,296,379 B1 * | 11/2007 | Peter | 47/33 |
| 7,845,656 B2 * | 12/2010 | Thompson | 280/79.5 |
| 8,006,996 B1 * | 8/2011 | Johnston | 280/651 |
| 8,167,254 B2 * | 5/2012 | Hopkins | 248/137 |
| 8,444,097 B2 * | 5/2013 | Morrow | 248/164 |
| 2002/0078624 A1 * | 6/2002 | Saxon et al. | 47/42 |
| 2005/0199767 A1 * | 9/2005 | Gilbert | 248/97 |
| 2009/0149279 A1 * | 6/2009 | Fischer et al. | 473/417 |
| 2010/0108826 A1 * | 5/2010 | Fernandez et al. | 248/98 |
| 2011/0290961 A1 | 12/2011 | Kamon | |
| 2012/0205504 A1 * | 8/2012 | Cute | 248/150 |

\* cited by examiner

MOBILE ASSEMBLY WITH SCREEN FOR PLANT TRAINING

CROSS REFERENCE TO RELATED APPLICATIONS

This application claims the benefit of U.S. Provisional Application No. 61/532,312 filed on Dec. 15, 2010 which is hereby incorporated herein by reference.

TECHNICAL FIELD

This disclosure is related to plant cultivation and more particularly to plant training.

BACKGROUND

The statements in this section merely provide background information related to the present disclosure and may not constitute prior art.

For particular plant varieties, plant propagation and cultivation preferentially requires shaping of a plant canopy. Training is a method of growth control that allows one to shape their canopy to facilitate photosynthesis, and control growth and plant yield. Tying, bending, crimping and topping are all conventional training methods. Training branches, stems, and vines to grow where one wants in order to get the desired shape can be laborious and inefficient. Conventional training can leave plant canopies with void spaces, inefficiently using available space.

When many particular plants are allowed to grow through a screen, however, void spaces with a canopy can be decreased. This method of growing plants through a screen is sometimes referred to as a "screen of green" method because of the appearance of the plants through the screen. The "screen of green" method is a preferential method for growing many varieties of plants. In many known applications of the "screen of green" method, plants are grown in the ground in aisles or in makeshift, elevated containers placed in an aisle on planks or table structures. Long rectangular screens are placed above the plants generally secured to a wooden frame and elevated above the ground or the plant containers. These methods are insufficient, however, for certain varieties of plants that can benefit from positional adjustment to control lighting conditions or practical spatial considerations. Therefore it would be advantageous to produce a mobile screen training assembly to move plants to preferential lighting or to preferential space.

SUMMARY

A mobile plant training apparatus is disclosed. The mobile plant training apparatus includes a screen frame, a screen coupled to the screen frame, and a mobile assembly configured to removeably secure a container and secure the screen frame above the container.

BRIEF DESCRIPTION OF THE DRAWINGS

One or more embodiments will now be described, by way of example, with reference to the accompanying drawings, in which.

DETAILED DESCRIPTION

Figure 1:
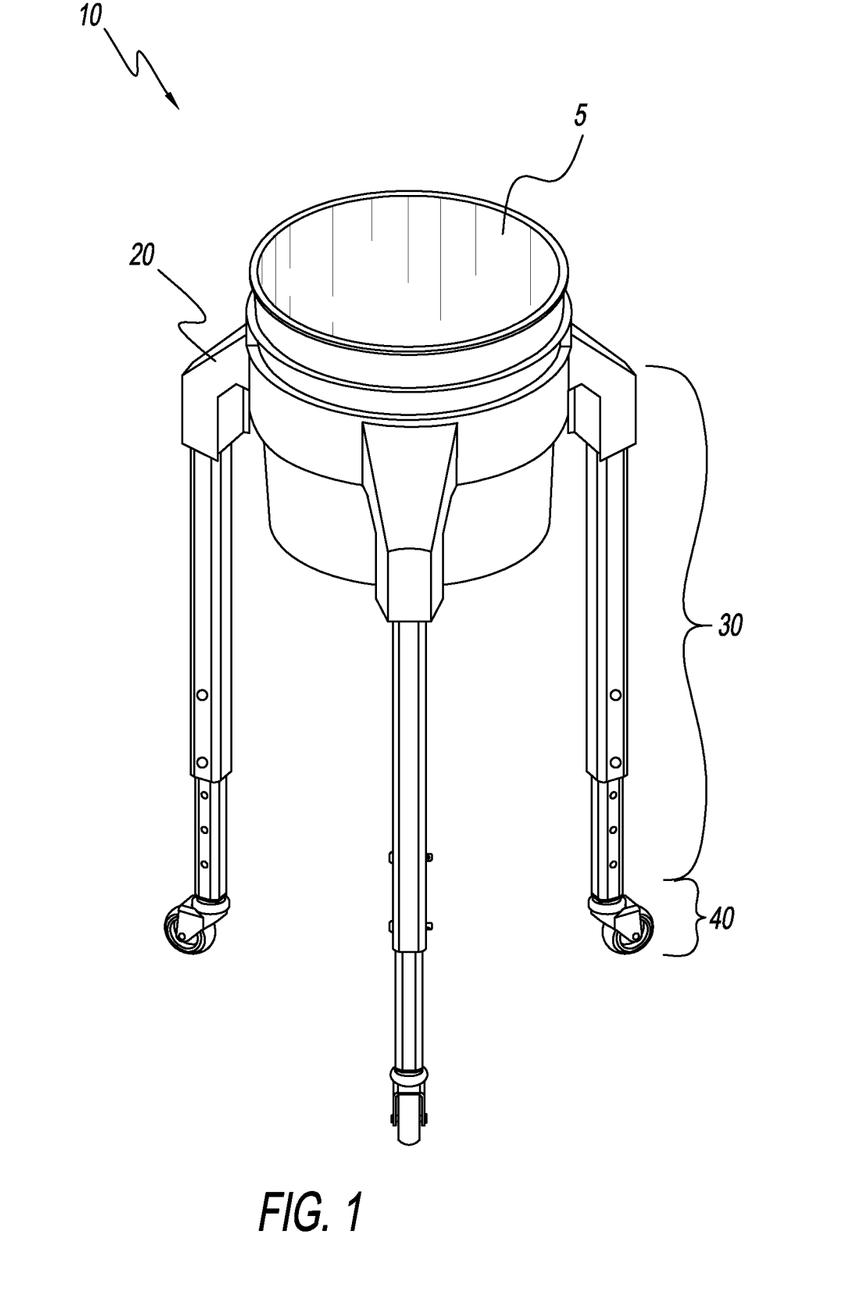
FIG. 1 shows an exemplary mobile assembly, in accordance with the present disclosure.

Referring now to the drawings, wherein the showings are for the purpose of illustrating certain exemplary embodiments only and not for the purpose of limiting the same, FIG. 1 shows an exemplary stackable wheeled mobile assembly 10. The exemplary mobile assembly 10 includes an elliptical support ring 20 including cavities for leg attachments, wheel assemblies 40 and leg assemblies 30. The mobile assembly 10 is configured to receive a bucket 5 by supporting a ledge of the bucket on the elliptical support ring 20 as described herein below. The mobile assembly 10 is preferably configured to secure and aid in the movement of an elliptical-shaped container while allowing it to remain elevated at a desired height. As used herein, "secured" includes embodiments in which the elements are attached e.g., via adhesive, screw, bolt, solder, weld, or other attachment mechanism or are simply formed of the same material, i.e., formed integral with, attaching the various elements by bonding or contacting two surfaces to each other and does not require a permanent engagement.

The mobile assembly 10 is preferably adapted for an elliptical-shaped container with an unobstructed smooth lower ridge. Smooth unobstructed lower ridge refers to the bottommost ridge in the upper, outside portion of a container 5 being smooth and free of obstacles including but not limited to container handle supports, any molded reinforcements, or any obtrusion created from an aesthetic feature. In one embodiment, the mobile assembly 10 is moveable along a floor or ground via 3 stem mount wheels such as the wheel assemblies 40 inserted into hollow core access point of the lower legs. Each wheel assembly in the exemplary embodiment will hold a third of the load and move on a smooth level surface. In one embodiment, wheels are configured to support a minimum of 60 lbs each. Preferably, the mobile assembly 10, once fully assembled, can support at least 80 lbs of total weight from the round plastic container place upon it.

The container 5 may be any known bucket or pail including a vertical cylinder or truncated cone-shaped structures configured to hold a planted plant. Some container types have become standard in the market place serving multi-purposes for individual and business needs. For example, 3.5 gallon and 5 gallon bucket sizes are well known and generally available in a standard type including height, diameter, bucket rim, and bucket ledge. Generally, the standard bucket sizes and configurations are constructed from a plastic material. In one embodiment, the mobile assembly 10 is configured to receive a 5 gallon plastic bucket. In one embodiment, the mobile assembly 10 is configured to receive a 3.5 gallon plastic bucket.

The exemplary elliptical support ring 20 includes the three leg housings 22 which receive the leg assemblies 30. The elliptical support ring 20 secures a container upon its uppermost edge where it preferably contacts the full lowermost outer ridge of the container in the mobile assembly 10. The elliptical support ring 20 is configured to hold the container 5 in the mobile assembly 10 to exert its load low and central within the mobile assembly 10 and, with the assistance of the leg housing 22, secure each leg assembly during use of the mobile assembly 10.

In one embodiment, a wheel assembly 40 is attached to each leg assembly. The wheel assemblies are, in one embodiment, stem mount wheels. The leg assembly 30 includes a receiving member 32 configured to receive a height adjustable member 34. The height adjustable member and receiving member each include at least one hole, and preferably multiple holes configured to receive a fastening means such as screws, or clevis or cotter pins. The fastening means are configured to hold the mobile assembly 10 at a desired height. The leg assembly members 32 and 34 may function as telescopic members selectively extending and retracting according to user preference.

One skilled in the art will readily recognize that alternative embodiments of the disclosure may include multiple additional wheel assemblies including four or more wheels and associated leg assemblies. The number of the wheels and leg assemblies may be determined based upon container size, e.g., more wheels and leg assemblies for larger containers.

Figure 2A:
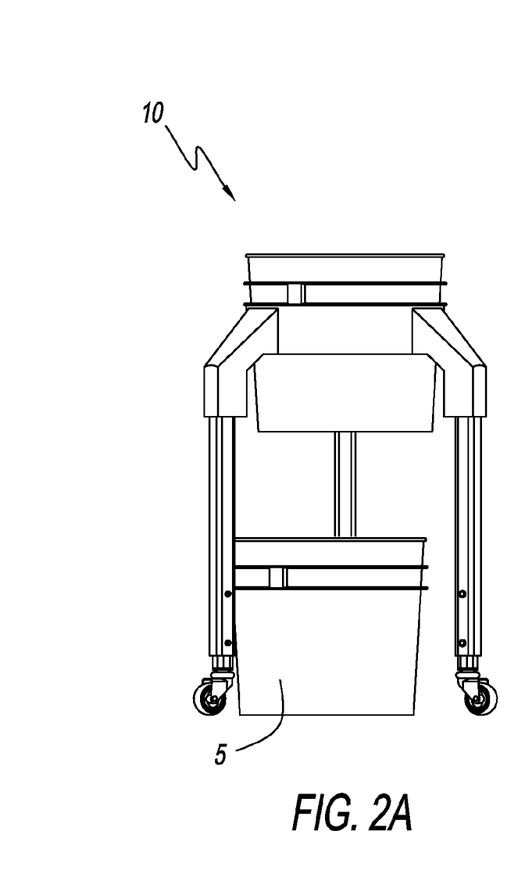
FIGS. 2A-2C show the a stackable wheeled mobile assembly at a variety of adjusted heights, in accordance with the present disclosure.
Figure 2B:
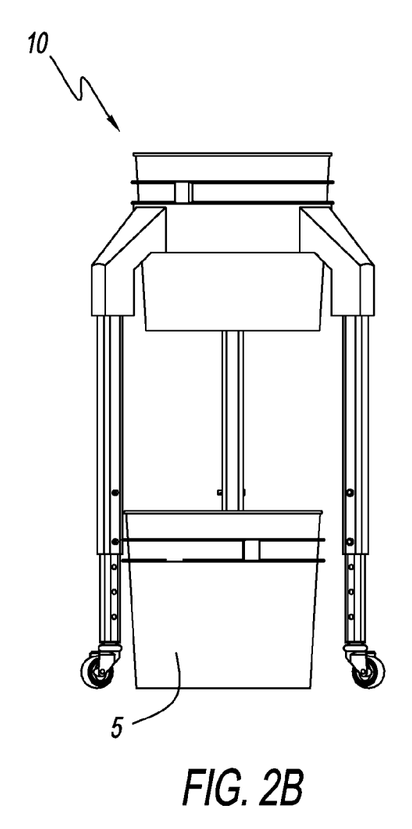
Figure 2C:
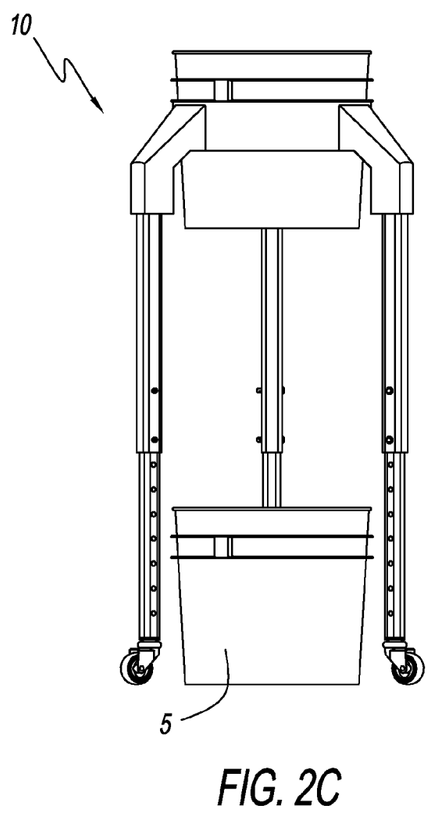

FIGS. 2A-2C show the stackable wheeled mobile assembly 10 at a variety of adjusted heights. Height of the mobile assembly 10 is adjusted by utilizing adjustment holes within the leg assemblies 30 as shown in FIG. 1. Preferably, the mobile assembly 10 is configured to adjust to a height permitting another container to be placed underneath an elevated container used in the mobile assembly 10. In one embodiment, the mobile assembly 10 permits a round 3.5 or 5 gallon plastic bucket to be placed upon it while also allowing for an additional round 3.5 or 5 gallon plastic bucket to be placed underneath it, or alternately the stand to be rolled over an additional round 3.5 or 5 gallon plastic bucket. In this way, for a horticulture application, the mobile assembly 10 may permit watering of a plant contained in the container 5 while water runoff may be caught in a bottom container.

Figure 3:
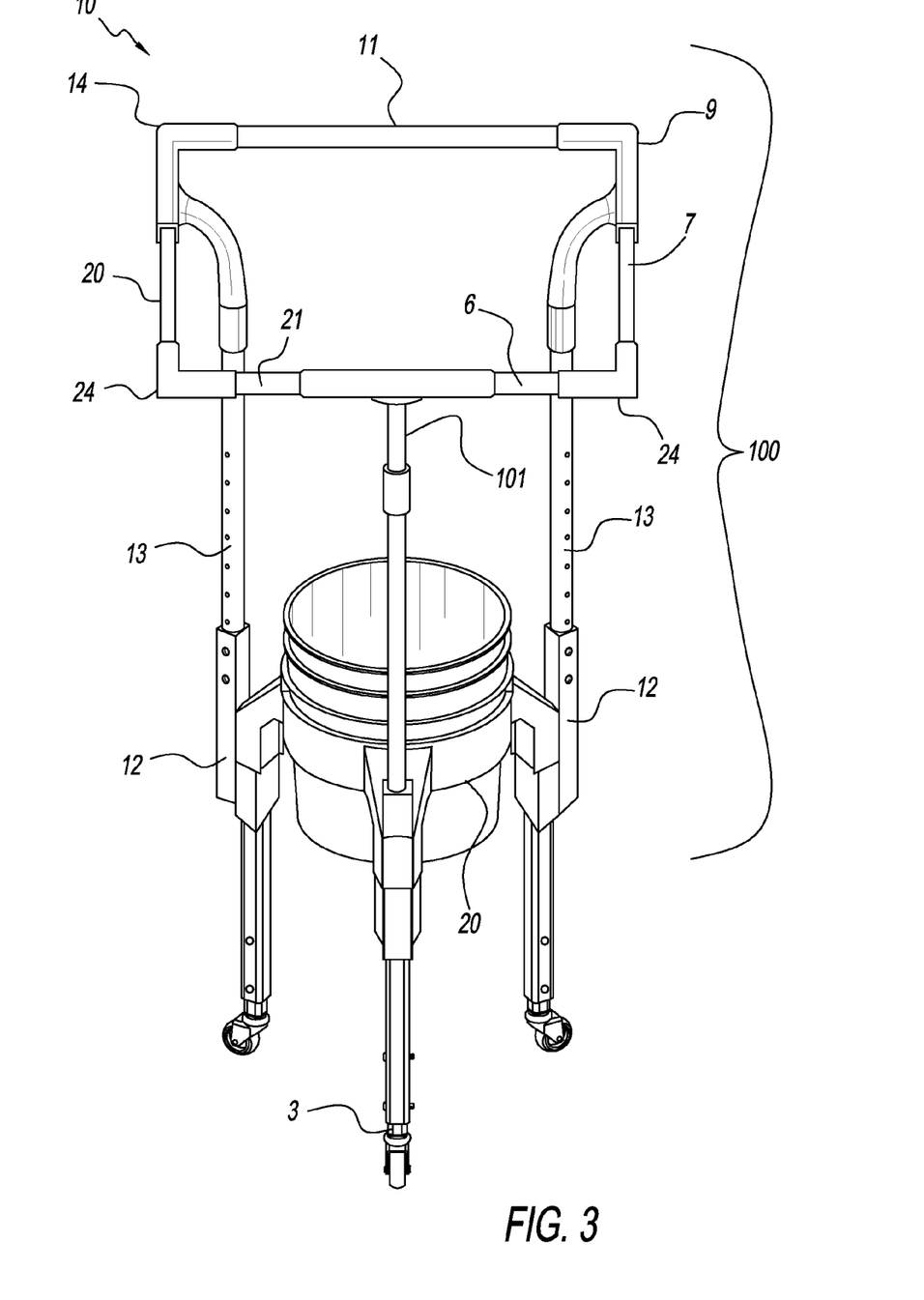
FIG. 3 shows a perspective view of the mobile assembly with an attached screen assembly, in accordance with the present disclosure.

FIG. 3 shows a perspective view of the mobile assembly 10 with an attached exemplary screen assembly 100. As shown in FIG. 3, the screen assembly 100 includes a screen frame and one or more frame support elements. Exemplary support elements are shown in FIGS. 5A, 5B, 6, and 7.

Figure 5A:
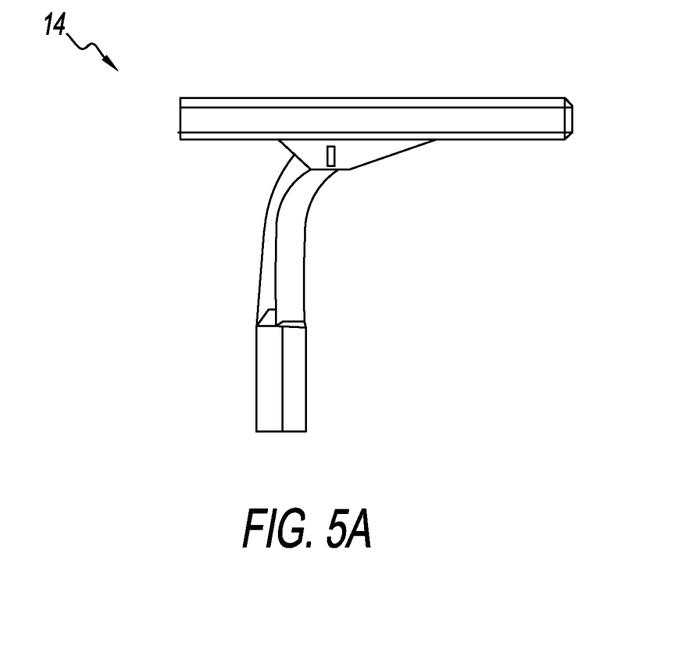
FIGS. 5A and 5B show corner frame elements of an exemplary screen frame, in accordance with the present disclosure.
Figure 5B:
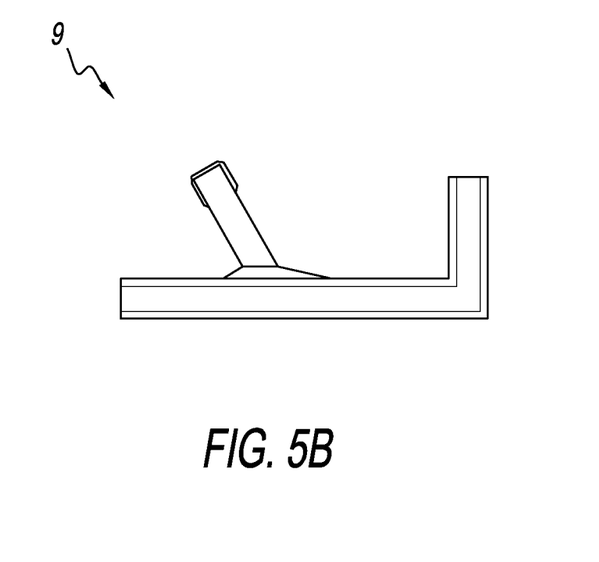
Figure 6:
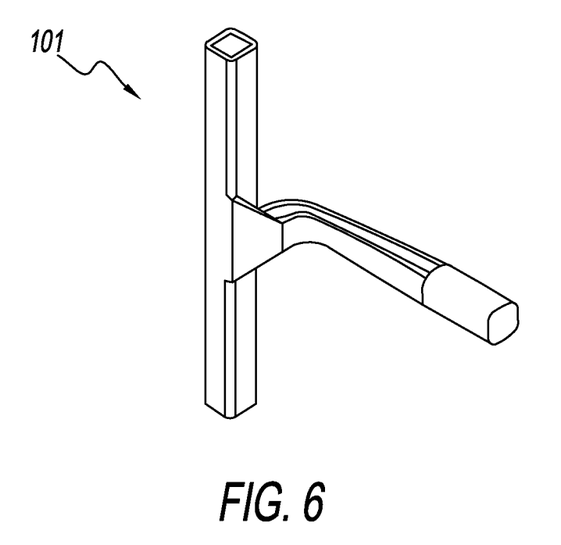
FIG. 6 shows an additional frame element of the screen frame, in accordance with the present disclosure.
Figure 7:
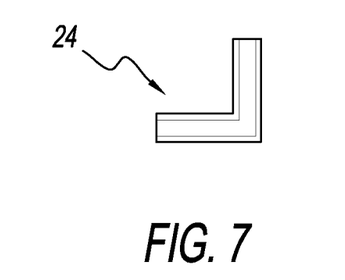
FIG. 7 shows a third frame element of the screen frame, in accordance with the present disclosure.

In one embodiment, the screen frame includes plurality of separable frame elements including a first corner element 14 as shown in FIG. 5A, a second corner element 9 as shown in FIG. 5B, a third and fourth corner element 24 as shown in exemplary FIG. 6, a T-shaped connector 101 as shown in FIG. 6, a first elongated member 11, second elongated member 6, third elongated member 7, fourth elongated member 20, and a fifth elongated member 21. The first corner element 14, second corner element 9, and T-shaped connector 101 are configured to engage screen frame support members 13. In one embodiment, the frame support members 13 are telescopic and configured for selective height adjustment according to user preference. It is contemplated by this disclosure that the screen frame may comprise any number of frame elements including an embodiment wherein the screen frame is a single contiguous element configured to engage a screen. In one embodiment, the screen frame may comprise any number of elements configured to engage frame support members depending on a particular application of the disclosure. For example, different weight and load requirements of a screen frame and application may preferably require more or less frame support members and the disclosure herein is not intended to be limited thereby. Exemplary embodiments of the first corner element 14 and the second corner element 9 are substantially shown in FIGS. 5A and 5B. FIG. 5B is a top view, while FIG. 5A is a front view. FIG. 6 is a perspective view of the T-shaped connector 101. FIG. 7 shows the third and fourth corner element 24 of the screen frame 100. In the embodiment shown and described, the third and fourth corner elements 24 do not include connectors to engage support members.

In one embodiment, the screen frame support assemblies include upper support members 6 and 13 configured to engage the screen frame and lower support members 12 and 16 configured to engage the mobile assembly 10 in a manner suitable to support the screen frame and a screen above the bucket. The upper support members 6 and 13 and the lower support members 12 and 16 are preferably selectively length adjustable. In one embodiment, the upper and lower support members engage using one or more known attachment methods such as frictional or force-based attachment means or secure mechanical-based attachment means such as a fastener, a nut and bolt assembly, tapered screws, and/or weld may additional be used. Those of ordinary skill in the relevant arts will understand and appreciate that multiple attachment means and fabrication methods may be used to assemble the upper and lower support members without departing from the present disclosure and is therefore not intended to be limited thereby. In one embodiment, the upper and lower support members include a plurality of holes configured to receive a fastening means such as screws, or clevis or cotter pins. The fastening means are configured to hold the screen frame and screen at a desired height above the bucket. In one embodiment, the screen frame support assembly 100 is a contiguous member of fixed length configured to support the screen frame at a predetermined height above the bucket. The screen frame support assembly 100 may be manufactured from plastic using any known process or material including plastic polymer from an injection molding manufacturing process, although other manufacturing processes are contemplated by this disclosure including blow molding and fabrication processes. In one embodiment, the upper support members 6 and 13 are inserted into a coupling cavity of lower support members 12 and 16 contiguously connected to the leg assemblies.

The screen frame support assembly 100 preferably includes means to removeably attach to the leg assemblies 30 of the mobile assembly 10. In one embodiment, the screen frame support assembly 100 is removeably attached to the leg assemblies 30 using mechanical means such as threaded bolts, fasteners, and/or a mounting bracket configured to couple to at least a portion of the leg assemblies. In one embodiment, the mounting bracket couples the screen frame support assembly 100 to the leg assemblies 30 using an adjustment fastener and one or more threaded fasteners configured to hold the screen frame support assembly against the leg assemblies.

Figure 4:
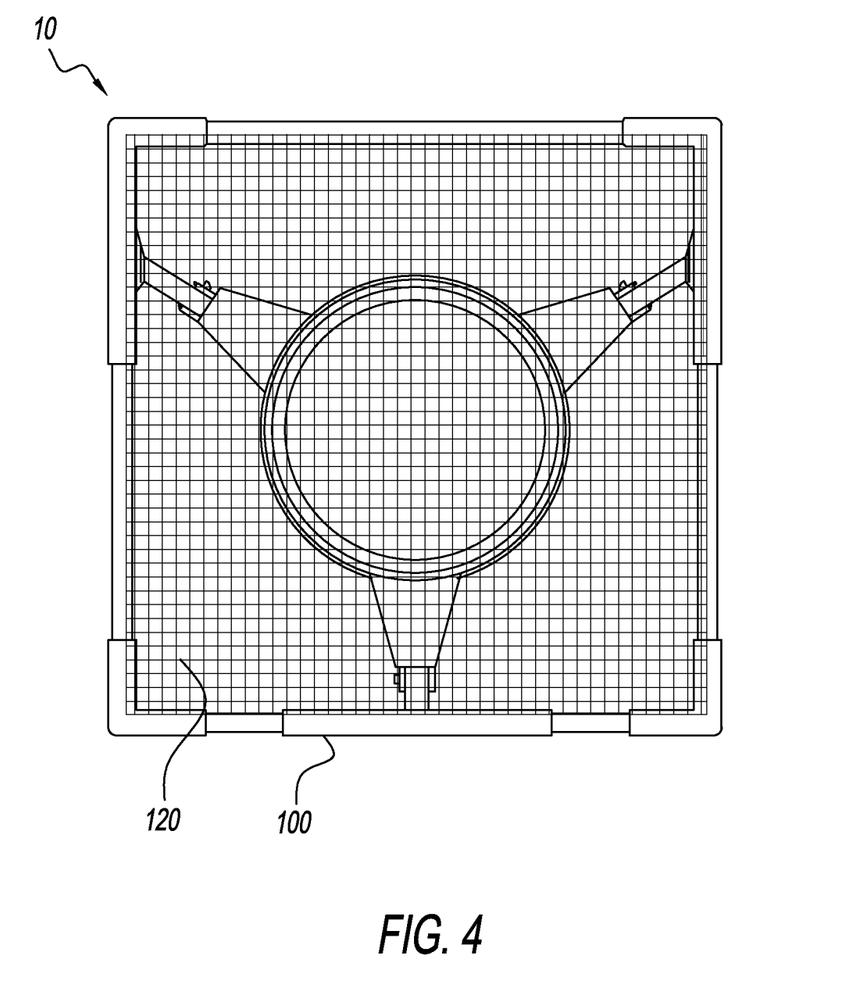
FIG. 4 shows a top view of the mobile assembly with the attached screen assembly, in accordance with the present disclosure.

FIG. 4 shows a top view of the stackable wheeled mobile assembly 10 with the exemplary screen assembly 100 and an exemplary bucket 5. The bucket 5 rests upon the mobile assembly 10 utilizing a bucket ledge. As FIG. 4 shows, the leg assemblies are preferably spaced equidistant from one another along a circumference of the elliptical support ring. For example, in the exemplary three leg embodiment of the mobile assembly 10, the leg assemblies 30 may be space 120-degrees from one another for preferential support. As shown in FIG. 4, the exemplary screen assembly 100 and screen 120 are rectangular in shape. As one skilled in the art will readily recognize and appreciate upon a careful reading of the disclosure herein, the screen assembly 100 and screen 120 may be manufactured in any one of a number of shape embodiments including, e.g., an elliptical, triangle, pentagon.

In one embodiment of the screen frame support assembly, multiple additional levels of screens are fitted onto the screen frame support assembly. In this way, each level of screens may screen a different sized substance or mass.

In one embodiment of the screen frame support assembly 100, the screen frame is attached to support member utilizing a hinge mechanical fastener on one axis thereby permitting the screen frame to swing from a vertical position permitting access to the bucket to a position over the bucket permitting use of the screen.

Figure 8:
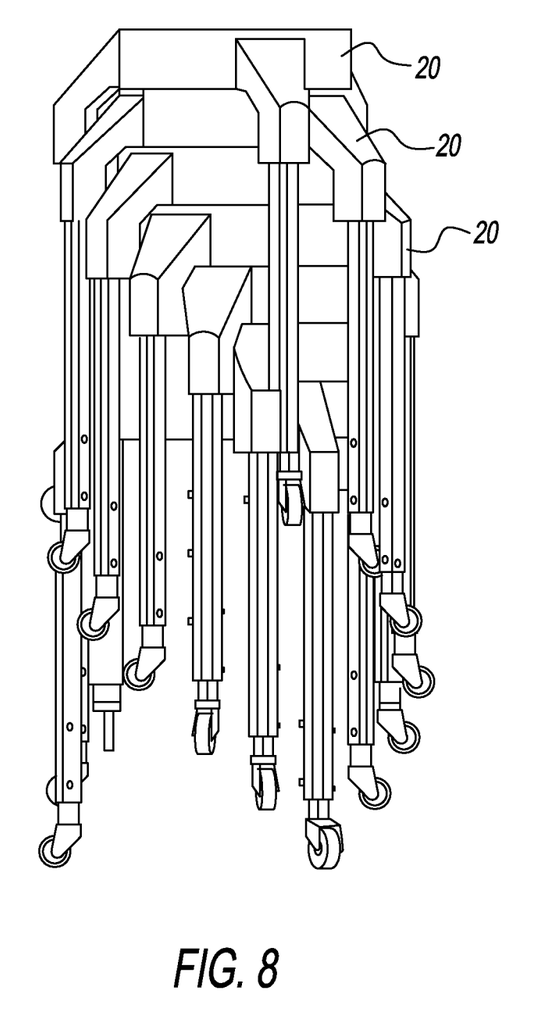
FIG. 8 shows a plurality of stackable wheeled mobile assemblies, in accordance with the present disclosure.

FIG. 8 shows a plurality of the elliptical support rings 20 and mobile assembly 10 in an exemplary stack. Storage space is a concern for businesses and individuals. The mobile assembly 10 is configured to save space with the ability to stack one mobile assembly 10 on top of another mobile assembly 10. The elliptical support rings 20 are also stackable for convenience during the manufacturing process or otherwise. The mobile assembly 10 and elliptical support rings 20 are stackable by positioning the leg housing 22 as not to align or intersect another leg housing 22.

In one exemplary application, the mobile assembly 10 is used for horticultural activities, a 3.5 or 5 gallon round plastic bucket commonly used in indoor cultivation as well as many various other fields, to be accommodated. The height of the mobile assembly 10 allows for a second round plastic bucket to be placed underneath the suspended bucket or, alternatively, the bucket 5 placed on the mobile assembly 10 to be wheeled over an empty bucket allowing for drainage collection from regular watering or required flushing of plants. The screen assembly permits separation of matter, permitting objects smaller than screen openings to pass through the screen and into the bucket. Objects larger that the screen openings remain on top of the screen. As one skilled in the art will readily recognize, the screen may be constructed out of any number known materials including common window screens, mesh wire including galvanized wire with hexagonal gaps of various-sized openings.

In operation, a round shaped 3.5 or 5 gallon plastic bucket or similarly shaped and configured bucket adapted for use with the mobile assembly 10 is placed down through the top of the mobile assembly 10 and wheeled around as needed. In one embodiment, the mobile assembly 10 can be specifically designed for use with standard and conventional round 3.5 & 5 gallon plastic buckets that have a smooth, unobstructed lower ridge. Other embodiments may be adapted to accommodate buckets lacking an unobstructed lower ridge as well as several versions of similarly shaped round 3 & 6 gallon plastic buckets. For height adjustment, the legs may be pinned to the desired length within the available range. The completed mobile assembly 10 may be stacked upon each other for convenient storage up to six high in one embodiment, the elliptical support rings can be stacked to an infinite height.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A mobile plant training apparatus comprising:
   a screen frame;
   a screen coupled to the screen frame; and
   a mobile assembly configured to removeably secure a container and secure the screen frame above the container, the mobile assembly comprising:
      a circular support ring configured to support the container, wherein the circular support ring comprises an upper support ledge configured to support a lower edge or rim of the container;
      a plurality of leg housings connected to the circular support ring and extending outwardly from an exterior side surface of the support ring, the leg housings each having a hollow interior portion configured to receive a leg assembly member;
      a plurality of leg assemblies, each leg assembly connected to the circular support ring via the plurality of leg housings at a perpendicular angle, within the hollow interior portions of the leg housings;
      a plurality of wheels, each wheel connected to a leg, wherein the screen frame includes selectively length adjustable screen frame support members attached to the leg assemblies.

2. The mobile plant training apparatus of claim 1, wherein the screen frame support members each comprising a receiving member configured to receive a height adjustable member.

3. The mobile plant training apparatus of claim 1, wherein the screen frame support members, each configured to attach to the leg assemblies of the mobile assembly using a mounting bracket configured to couple to at least a portion of the leg assemblies.

4. The mobile plant training apparatus of claim 3, wherein the mounting bracket is configured to couple to the leg assemblies using a fastening means.

5. The mobile plant training apparatus of claim 1, wherein the screen frame is a single contiguous piece.

6. The mobile plant training apparatus of claim 1, wherein the screen frame comprises four corner frame elements each configured to engage support members to create a quadrilateral-shaped screen frame.

7. A mobile assembly comprising:
   an elliptical support ring configured to support a bucket, wherein the elliptical support ring comprises an upper support ledge configured to support a lower edge or rim of the bucket;
   a plurality of leg housings contiguously and integrally connected to the support ring and extending outwardly from an exterior side surface of the support ring, the leg housings each having a hollow interior portion configured to receive a leg assembly member;
   a plurality of telescopic leg assemblies, each telescopic leg assembly connected to the support ring via the leg housings at a perpendicular angle, within the hollow interior portions of the leg housings;
   a plurality of wheels, each wheel connected to one of the plurality of telescopic leg assemblies;
   one or more screen frame support members each configured to attach to one of the plurality of telescopic leg assemblies; and
   a screen frame attached to each of the screen frame support members; and
   a screen coupled to the screen frame, wherein the screen frame support members are selectively length adjustable.

8. The mobile assembly of claim 7, wherein each of the plurality of wheels comprises a stem mounted wheel.

9. The mobile assembly of claim 7, wherein the screen frame support members each comprise a receiving member configured to receive a height adjustable member.

10. The mobile assembly of claim 7, wherein the screen frame support members are each further configured to attach to leg assemblies of the mobile assembly.

11. The mobile assembly of claim 7, wherein the screen frame support members are each further configured to attach to leg assemblies of the mobile assembly using a mounting bracket configured to couple to at least a portion of the leg assemblies.

12. The mobile plant training apparatus of claim 11, wherein the mounting bracket is configured to couple to the leg assemblies using a fastening means.

13. The mobile assembly of claim 7, wherein the screen frame is a single contiguous piece.

14. The mobile assembly of claim 7, wherein the screen frame comprises four corner frame elements each configured to engage support members to create a quadrilateral-shaped screen frame.

15. A method for screening matter, the method comprising:
providing an elliptical support ring configured to support a bucket using a top support ledge, wherein the top support ledge is configured to support the bucket using a rim of the bucket;
supporting the elliptical support ring using a plurality of leg assemblies configured to selectively adjust a support height, wherein the leg assemblies each comprise a plurality of leg housings contiguously and integrally connected to the support ring and extend outwardly from an exterior side surface of the support ring, the leg housings each having a hollow interior portion configured to receive a leg assembly member;
providing one or more screen frame support members each configured to attach to one of the leg assemblies and each support frame member is selectively length adjustable;
providing a screen frame attached to each of the screen frame support members; and
providing a screen coupled to the screen frame.

* * * * *